(12) United States Patent
Coenen

(10) Patent No.: US 6,590,307 B2
(45) Date of Patent: Jul. 8, 2003

(54) DEVICE FOR CONTROLLING THE RADIAL ORIENTATION OF A RAPIDLY ROTATING ROTOR SUPPORTED IN A CONTACTLESS MANNER

(75) Inventor: Norbert Coenen, Mönchengladbach (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 10/062,876

(22) Filed: Jan. 31, 2002

(65) Prior Publication Data

US 2002/0103568 A1 Aug. 1, 2002

(30) Foreign Application Priority Data

Feb. 1, 2001 (DE) ........................................ 101 04 419

(51) Int. Cl.[7] ................................................. H02K 7/09
(52) U.S. Cl. .................................................... 310/90.5
(58) Field of Search .......................... 310/90.5; 701/124

(56) References Cited

U.S. PATENT DOCUMENTS

| 5,313,399 | A | * | 5/1994 | Beale .......................... 701/124 |
| 5,486,729 | A | * | 1/1996 | Hirama ....................... 310/90.5 |
| 6,124,658 | A | * | 9/2000 | Coenen ....................... 310/90.5 |
| 6,346,757 | B1 | * | 2/2002 | Shinozaki ................... 310/90.5 |

FOREIGN PATENT DOCUMENTS

| DE | 26 58 668 A1 | 10/1978 | ............ G05B/11/01 |
| DE | 31 20 691 A1 | 12/1982 | ............ F16C/32/04 |
| DE | 32 08 133 C2 | 7/1983 | ............ F16C/39/00 |
| DE | 31 48 944 A1 | 8/1983 | ............ F16C/39/04 |
| DE | 33 23 648 A1 | 1/1984 | ............ F16C/32/04 |
| FR | 2 706 549 | 12/1994 | ............ F16C/32/06 |

* cited by examiner

Primary Examiner—Burton S. Mullins
(74) Attorney, Agent, or Firm—Kennedy Covington Lobdell & Hickman, LLP

(57) ABSTRACT

A device for the attitude control of a rapidly rotating rotor, especially a spinning rotor, supported in a contactless manner. The device comprises a sensor device for the continuous generation of rotor attitude signals and a control device (6) that processes the rotor attitude signals and continuously outputs a correcting variable to an actuating device that influences the rotor attitude. The control device (6) is set up in such that the rise of the waveform of a resultant signal from which the correcting variable is derived is limited to a maximum amount and, upon the occurrence of higher oscillation frequencies of the rotor attitude signals, the oscillation amplitudes of the resultant signal for the actuating device can at the same time be reduced with a small phase error. The device makes it possible to achieve low energy consumption, an expanded controllability and greater operational safety in a simple manner.

11 Claims, 6 Drawing Sheets

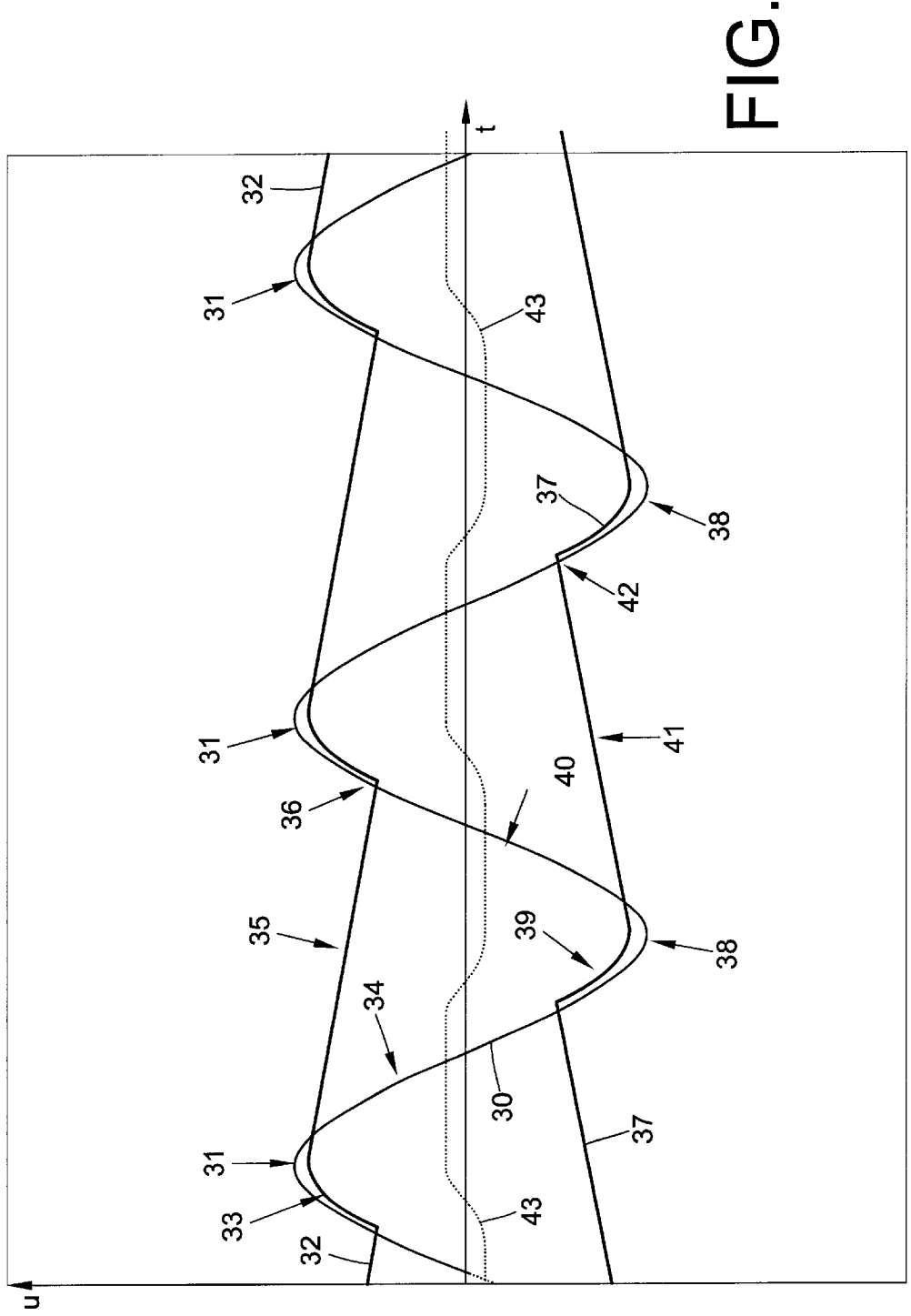

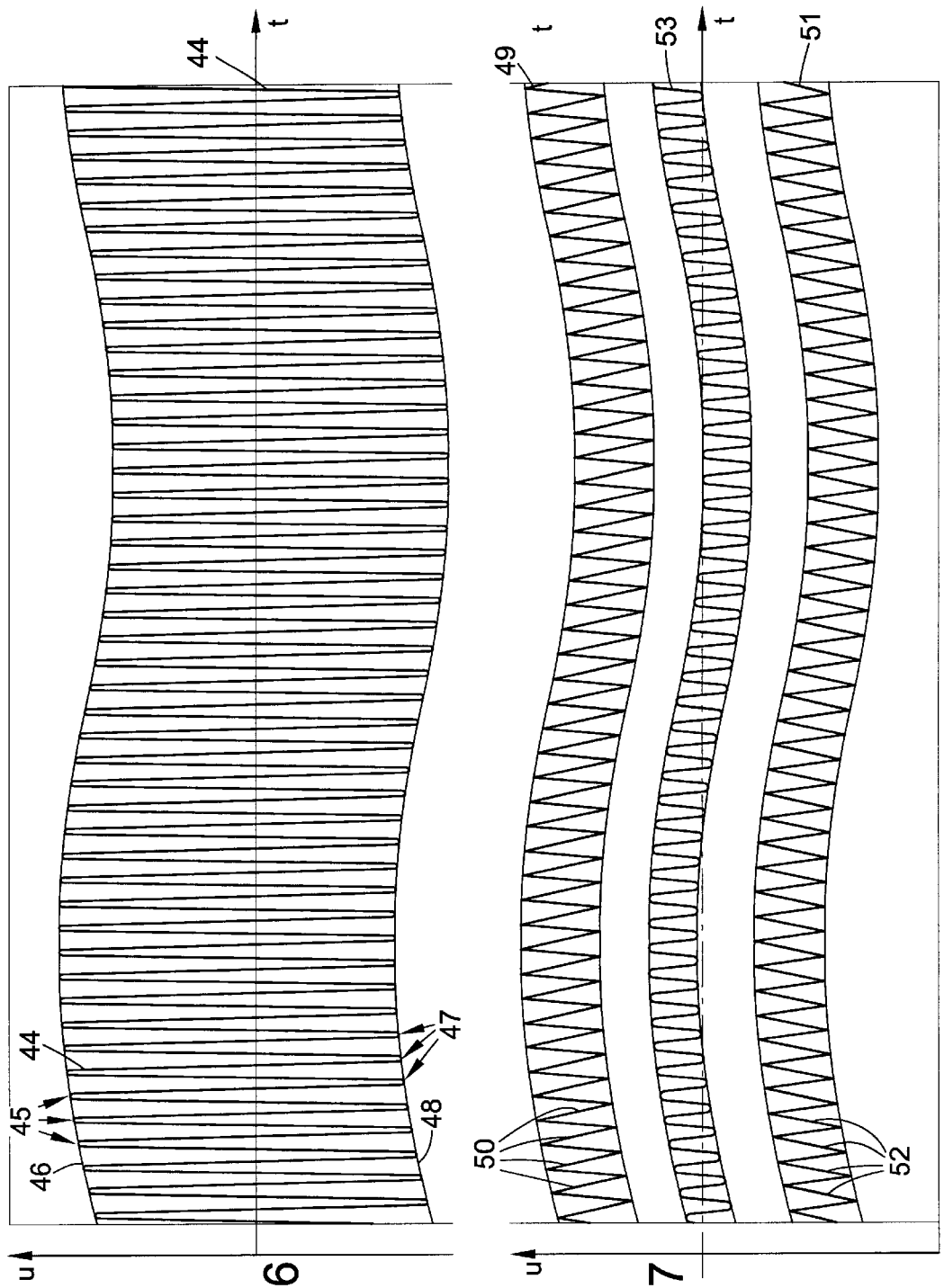

DEVICE FOR CONTROLLING THE RADIAL ORIENTATION OF A RAPIDLY ROTATING ROTOR SUPPORTED IN A CONTACTLESS MANNER

CROSS-REFERENCES TO RELATED APPLICATIONS

This application claims the benefit of German patent application DE P 10104419.4 filed Feb. 1, 2001, herein incorporated by reference.

1. Field of the Invention

The invention is relative to a device for the radial attitude control of a rapidly rotating rotor, especially a spinning rotor, supported in a contactless manner.

2. Background of the Invention

Contactless, passive support bearings or contactless, active supports with regulators for attitude stabilization or damping of oscillations are known in a great variety of embodiments.

For example, German Patent Publication DE 33 23 648 A1 shows a magnetic support comprising an actuating mechanism with electromagnetic coils. The magnetic support comprises two bearing parts offset relative to one another along the direction of the axis of rotation of a rotor. Translatory deviations of the instantaneous position of the axis of rotation from an ideal position are to be determined for two directions perpendicular to one another and to the axis of rotation of the rotor and stabilized by the controlling of magnetic forces. In addition, tilting movements of the rotor about axes of rotation parallel to the two directions perpendicular to the axis of rotation are determined and a restoring moment generated about these axes, and switching means are further provided for damping the nutation frequency. The nutation of the rotor is damped thereby by cross-coupling branches. Since all attitudinal deviations are stabilized, there is a constant readjusting in the case of high rotor speeds and the actuating mechanism is highly controlled. This is disadvantageous as concerns the consumption of energy and the load on the control elements and causes limitation phenomena in the control of the actuating mechanism, such as, for example, in the amplifiers. In particular, an elevation of amplitude in the so-called D-component in regulators (for example, in PD controllers or regulators) results at high frequencies and at high speeds and thereby results in high amplitude values of the control voltage. As a consequence, the power requirement of such a control is high. When the rotor speed is accelerated, increased power is required only for a brief time, for example, for fractions of a second as the speed passes through a resonance frequency of the support system. High power is constantly necessary in such attitude controls at the high operating speeds of rapidly rotating rotors, such as, e.g., in the case of spinning rotors.

In order to achieve a certain quietness and to be able to operate with less power, it is known that the rotor can be allowed to rotate not about its geometric axis but rather about its axis through the center of gravity or about the axis of inertia. For example, German Patent Publication DE 26 58 668 A1 discloses a magnetic support for a rotor in which the disturbing influences stemming in particular from imbalances and dependent on the rotor speed are reduced by means of a suppression filter. To this end, the control circuit of the magnetic support comprises a filter device interposed between the sensor device and the control circuit for the signals supplied from the sensor device. The filter device is designed as a suppression device whose frequency is adjusted according to the speed of the rotor. The suppression filter filters out disturbances of the rotor attitude that occur periodically with the rotational frequency and that would bring about a constant readjusting of the rotor into the central attitude. To this end, adding circuits and a negative feedback circuit are used. However, great complexity is necessary for the described circuits, which results in a relative great susceptibility to interference in the entire circuit. Moreover, such filter circuits cause significant phase rotations and/or phase errors that are generally recognized as disadvantageous. These phase rotations or errors can amount to more than 90 degrees and can endanger the stability of the control circuit or else which must themselves be compensated for in an expensive manner. Due to the carried-out adjustment of the effect of the suppression filter to a certain rotational speed of the rotor the desired effect does not occur at rotary frequencies deviating from this adjustment.

German Patent Publication DE 31 20 691 A1 describes a magnetic support in which deviations from the geometry of the rotor are detected by a sensor device and stored in a data storage along with the corresponding particular angular position at the rotary motion of the rotor. The detection takes place in a rotor-specific manner and is carried out before the particular rotor is put in operation. The stored values remain preserved for the entire operating time of the rotor. The disturbance signals generated by the sensor device and those deriving from errors of geometry are superposed and thus compensated by means of a correction signal. Unfortunately, the use of such a device, especially in spinning rotors of a rotor spinning machine, has disadvantages. Spinning rotors are subject to wear that can necessitate the replacement of the particular spinning rotor. If necessary, spinning rotors are also replaced during a batch change as a function of the fibrous material or yarn used. Thus, the replacement of spinning rotors that is unavoidably repeated when using spinning rotors requires significant expense on account of repeated detection operations. Also, a rather large computer capacity must constantly be available in order to store the amounts of data and to continuously process them. Further, imbalances which are not traceable to detectable errors of geometry, such as imbalances due to inhomogeneity of the rotor material or due to trash that can adhere and collect in the area of the rotor groove of spinning rotors, are not compensated in the device described in German Patent Publication DE 31 20 691 A1.

SUMMARY OF THE INVENTION

The present invention seeks to address the problem of improving the attitude control of rotors which are supported in a contactless manner.

The invention addresses this problem by providing a sensor device for the continuous generation of rotor attitude signals and a control device for processing the rotor attitude signals. The control device includes a controller that outputs a rotary-frequency-dependent output resultant signal or correcting variable, generated from the rotor attitude signals, for controlling the actuating device. The resultant signal follows the rotary-frequent waveform of the controller output signal at frequencies below the resonance frequencies of the contactless support, while above these resonance frequencies the resultant signal increasingly follows the rotary-frequent waveform of the controller output signal only in the area of at least one of the two extreme values (i.e., the minimum and maximum values) of the waveform, whereby the amplitude of the resultant signal is distinctly smaller than the amplitude of the rotary-frequency-dependent controller output signal. Further, the resultant signal of the rotary-frequency-dependent oscillation maps superposed oscillations of the controller output signal that are low-frequency in comparison to it in a practically unchanged manner.

Such a control device permits, upon the occurrence of rather high oscillatory frequencies, the lowering of the oscillation amplitudes of the oscillation dependent on the rotary frequency with small phase errors at the same time as regards the relatively low resonance frequencies and therewith permits an advantageous reduction of the power consumption of the attitude control as well as increased quietness of the rotor without customary suppression filters and without the above-mentioned disadvantages of the state of the art. The small phase errors that occur thereby do not endanger the stability of the control and are tolerable. On the other hand, the phase rotation that can be produced by customary deep-pass filters is significantly greater.

The reduction of the amplitude of the rotary-frequency-dependent oscillation of the resultant signal relative to the amplitude of the rotary-frequency-dependent oscillation of the controller output signal is preferably brought about by limiting the rise of the curve of the resultant signal to a maximum amount outside of the areas in which the resultant signal follows the waveform of the controller output signal. The concept "follow" used here also includes the instance in which there is only a slight difference between the resultant signal and the waveform of the controller output signal. The limitation of the rise applies not just to the area in which the rise of the controller output signal is positive, but also the area in which the rise of the oscillation of the controller output signal is negative (that is, if the curve falls). In the latter case, the rise of the curve and the slope of the resulting waveform are likewise limited to the maximum amount. The maximum amount can therefore also be considered as an absolute amount. As long as the rise of the controller output signal is below the limitation, the resultant signal follows the controller output signal and the control corresponds completely to the control algorithm. In contrast thereto, in the case of higher-frequency, rotary-frequency-dependent oscillations of the control output signal in which the waveform of the controller output signal sharply rises or falls and the rise exceeds the limitation, a reduction in the amplitude occurs, in accordance with the invention, in the rotary-frequency-dependent oscillations of the resultant signal used to generate the actuator control signal for the actuating device. For example, the magnitude of a voltage or of a current can be used as signal magnitude or as a correcting variable. The distinct reduction of signal components with high frequency and high amplitude, such as, for example, the rotary-frequency-dependent oscillation components of the controller output signal in the resultant signal, opens the possibility of an expanded ability to control low-frequency disturbing influences, such as, for example, the nutation of a rotor, without having to fear an overloading, of, for example, the actuating elements. The amplitude- and phase error produced in the amplitude reduction of the rotary-frequency-dependent oscillation components remains so slight or negligible that no instability of the control can occur. The avoidance of an overload as well as the extant stability of the control increase the operational safety. The apparatus of the present invention can be flexibly used as regards the rotor speeds, and is not subject to any limitation in as far as the presence or maintenance of a predetermined speed is concerned.

The advantageous effect of the invention can be achieved in a relatively simple manner and with low expense if the area in which the limitation of the rise of the curve of the resultant signal is effective over a maximum amount begins at the extreme value and ends when the value of the controller output signal attains again the instantaneous value of the resultant signal.

In an advantageous embodiment the control device is set in such a manner that the width of the particular area in which the resultant signal follows the waveform of the controller output signal is determined as a function of the rotary frequency and outside of these areas the rise of the curve of the resultant signal is preferably zero.

In the case of relatively low-frequency oscillations, such as in the case of support resonance frequencies, the area in which the resultant signal follows the waveform of the controller output signal may extend over the entire waveform. In the case of frequencies so far above the support resonance frequencies that their damping cannot be adversely impacted, the other area, in which the limitation of the rise takes effect and the rise is therewith constant in this other area, also participates in the waveform of the resultant signal. As the rotary frequency rises, the amount of the other area is increased to the extent to which the amount of the first area drops. As a result of the fact that the resultant signal still follows the controller output signal in a periodically reoccurring fashion in at least one area, the resultant signal remains phase-locked to the particular rotary frequency. The phase is synchronized and a drifting off avoided.

In another preferred embodiment of the present invention, a processor may be utilized to determine the width and the position of the respective first area, in which the resultant signal follows the waveform of the controller output signal, and of the other area, in which the rise is limited. The same effect can be achieved at a low cost without the necessity of making computer capacity available by means of a suitable circuit.

In another preferred embodiment of the present invention, the direct current component of the signal can be decoupled in a simple manner with a capacitor connected in after the control device. The passage of the nutation frequency takes place without appreciable phase error and without appreciable phase shift. The nutation of the rotor, especially that of a spinning rotor, can thus be effectively damped.

The control device is preferably set so that the rotary frequency at which the waveform of the resultant signal follows the waveform of the controller output signal only in the area of one of the two extreme values is at least twice as high as the decisive resonance frequency of the contactless support. High speed frequencies and/or oscillation frequencies occur, if, for example, the rotor is a spinning rotor rotating at the operating speed. Low-frequency resonance oscillations of the support system operating in a contactless manner that are to be damped remain preserved practically unaffected, and these oscillations can be effectively stabilized or damped by the signal used as the correcting variable.

The control device is preferably set up for forming a new signal as the arithmetic average of two resultant signals. One resultant signal follows the waveform of the controller output signal only in the area of one of the two extreme values and the other resultant signal follows it only in the area of the other of the two extreme values, and the new signal formed from the arithmetic average is advantageously output as the actuating control signal to the actuating device. In this manner an improved smoothing of the signal used as the correcting variable can be achieved with a further resulting lowering of the power requirement of the rotor support control.

A quasi-symmetric circuit design having two branches, each of which includes at least one diode, a capacitor whose capacitance determines the maximum amount of the rise for the area in which the limitation is effective, a constant current source and a resistor, requires no great expenditure for construction or any computer capacities. A-D converters or D-A converters are not necessary with this circuit because the signal processing can take place in a totally analog manner. The range of the area in which the resultant signal follows the controller output signal is generated automatically as a function of the rotary frequency.

The amplitude-lowering effect of the device of the invention may be improved by using resistors in the circuit such that the currents flowing in the respective resistors are distinctly smaller than the currents flowing in its associated constant current source If the contactless support is an active magnetic support, available actuating elements can be used.

The effect produced by the lowering of the amplitudes corresponds to a so-called imbalance suppression. If the rotor rotates on its axis of inertia or its axis of gravitation, no continuous readjusting with high controlling of the actuating elements takes place. The power required for attitude control is relatively low. The device of the invention constitutes a simple, very economical and energy-saving but very effective means for attitude control and for active damping when passing through the support resonance frequencies and particularly in the nutation of rotors supported in a contactless manner. The device of the invention can achieve, in addition to the low consumption of energy, an expanded ability to control and greater operational safety in radial support controls of a rapidly rotating rotor supported in a contactless manner, especially of a spinning rotor.

Further details of the invention will be understood from the following description of an exemplary embodiment with reference to the accompanying drawings.

BRIEF DESCRIPTION OF THE DRAWINGS

FIG. 5 is a graphical illustration of an input waveform as well as the signals resulting from it.

FIG. 6 is a graphical illustration of a waveform representing the attitude of a spinning rotor rotating at a high speed.

FIG. 7 is a simplified graphical illustration of waveforms that result from the waveform shown in FIG. 6.

DESCRIPTION OF THE PREFERRED EMBODIMENTS

Figure 1:
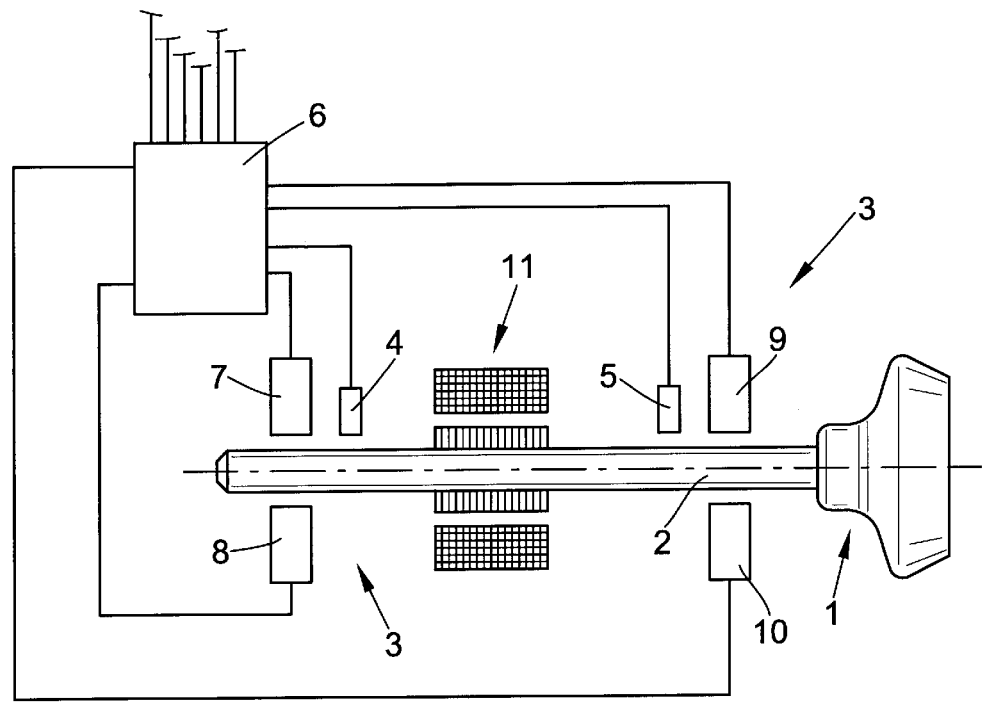
FIG. 1 is a schematic view of a magnetic support of a spinning rotor.

Referring now to the accompanying drawings and initially to FIG. 1, a spinning rotor 1 is held on a rotor shaft 2 by a magnetic support 3. The position or attitude of rotor shaft is detected in a known manner by a sensor device comprising sensors 4, 5. The sensor device continuously generates detector signals and supplies them to a control device 6, which outputs corresponding actuating signals. Actuating elements 7, 8, 9, 10 associated with the sensors 4, 5 comprise magnetic coils and serve to maintain the desired attitude of spinning rotor 1. A drive device 11 imparts rotary movement to the spinning rotor 1. The actuating device is loaded with control voltage $U_{ST}$ in order to actuate actuating elements 7, 8, 9, 10 from control device 6. Other sensors and actuating elements that act in a corresponding manner, not shown for reasons of simplicity, are arranged staggered by 90 degrees in the direction of rotation of spinning rotor 1 to sensors 4, 5 and to actuating elements 7, 8, 9, 10. The actuating device is also loaded in the previously described manner from the control device 6 with an actuating control signal in the form of a control voltage $U_{ST}$ for these actuating elements.

Figure 2:
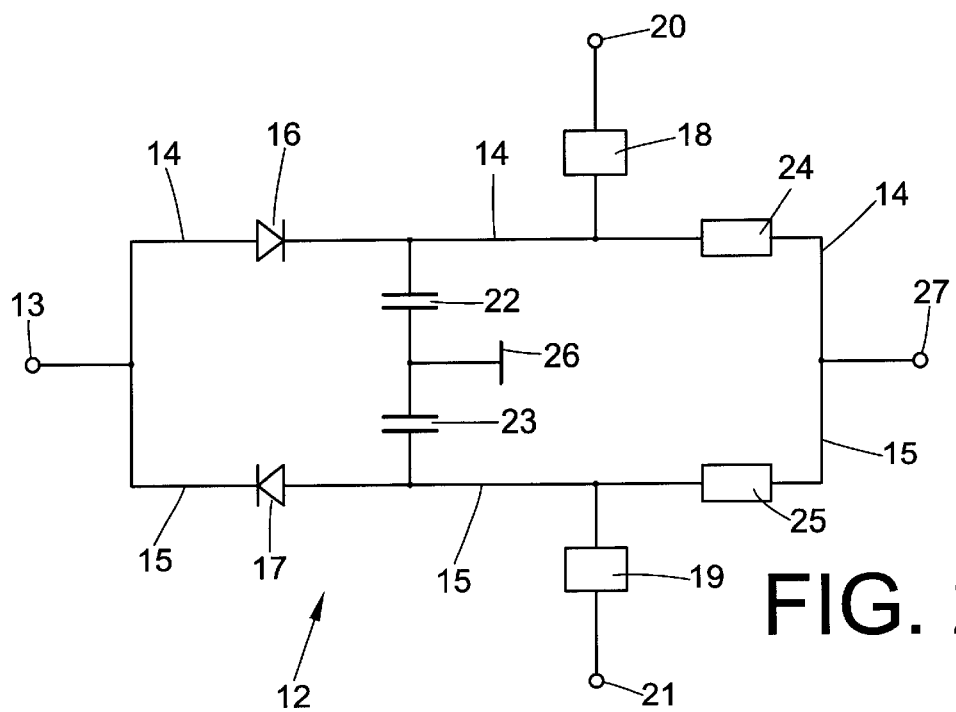
FIG. 2 is a schematic view of a circuit for limiting the rise of a resultant signal in accordance with the present invention.

In order to generate the particular control voltage $U_{ST}$, the control device 6 comprises a regulator with a very extensive D component and also comprises a circuit 12, shown in FIG. 2, which follows the regulator in the current path to the actuating device and to the particular actuating elements 7, 8, 9, 10.

A voltage $U_E$ is supplied on a voltage input 13 of the circuit 12 as the controller output signal of the PD regulator. Two parallel current paths 14, 15 run out from the voltage input 13. A diode 16 disposed in the course of one current path 14 allows current through when the voltage $U_E$ on voltage input 13 is positive relative to the instantaneous value on a capacitor 22. The diode 16 acts like a switch. A constant current source 18 is connected to the output of the diode 16 and also to a constant negative voltage source 20. The negative voltage source 20 of the exemplary embodiment of FIG. 2 supplies a voltage of, for example, minus 10 volts. The constant current source 18 comprises in a known manner a transistor whose base is supplied by a voltage that is constant in the example and comprises an emitter resistor. The capacitor 22 is disposed between the output of the diode 16 and ground 26 and a resistor 24 is disposed between the output of the diode 16 and a voltage output 27.

A second current path 15 is designed quasi symmetrically to the first current path 14. A diode 17 allows current through when a voltage $U_E$ that is negative relative to the instantaneous value on a capacitor 23 is on voltage input 13. A constant current source 19 is connected to the output of the diode 17 and also to a constant positive voltage source 21. The positive voltage source 21 supplies a voltage of, for example, plus 10 volts. The capacitor 23 is disposed between the output of the diode 17 and ground 26 and a resistor 25 is disposed between the output of the diode 17 and the voltage output 27.

The threshold of each of the diodes 16, 17 is approximately 0.6 volts in the exemplary embodiment. The capacitors 22, 23 and resistors 24, 25 are designed to be correspondingly equally large. The resistors 24, 25 are dimensioned in such a manner that the currents flowing in the respective resistors 24, 25 are distinctly smaller than the currents flowing in the associated constant current sources 18, 19.

In an alternative embodiment (not shown) of the circuit, the constant current sources 18, 19 can be designed only as resistors for the sake of simplicity.

The mode of operation of the circuit 12 is explained in the following. A controller output signal of the PD regulator of control device 6 that has a positive voltage results, via voltage input 13 and diode 16, in a positive voltage across the capacitor 22. In contrast, a controller output signal that is negative results, via diode 17, in a negative voltage across the capacitor 23. Conditioned by the feeding of constant currents from the constant current sources 18, 19, the capacitor voltage on capacitor 22 corresponds to the voltage $U_E$ minus the threshold voltage of diode 16. Similarly, the capacitor voltage on capacitor 23 corresponds to the voltage $U_E$ plus the threshold voltage of diode 17. A voltage at the same level as voltage $U_E$ is again adjusted via resistors 24, 25 acting as voltage dividers on voltage output 27 as output voltage $U_A$, that is, voltage $U_E$ is an alternating voltage with low frequency and low amplitude; voltage $U_E$ and voltage $U_A$ continue to remain substantially equal.

Figure 3:
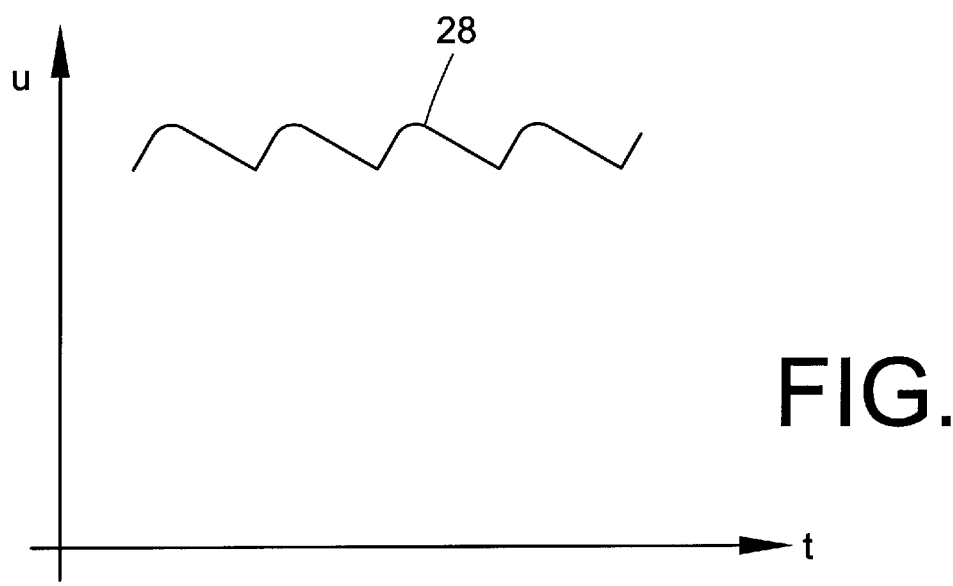
FIG. 3 is graphical illustration of a simplified waveform of the voltage on a capacitor of the circuit of FIG. 2.
Figure 4:
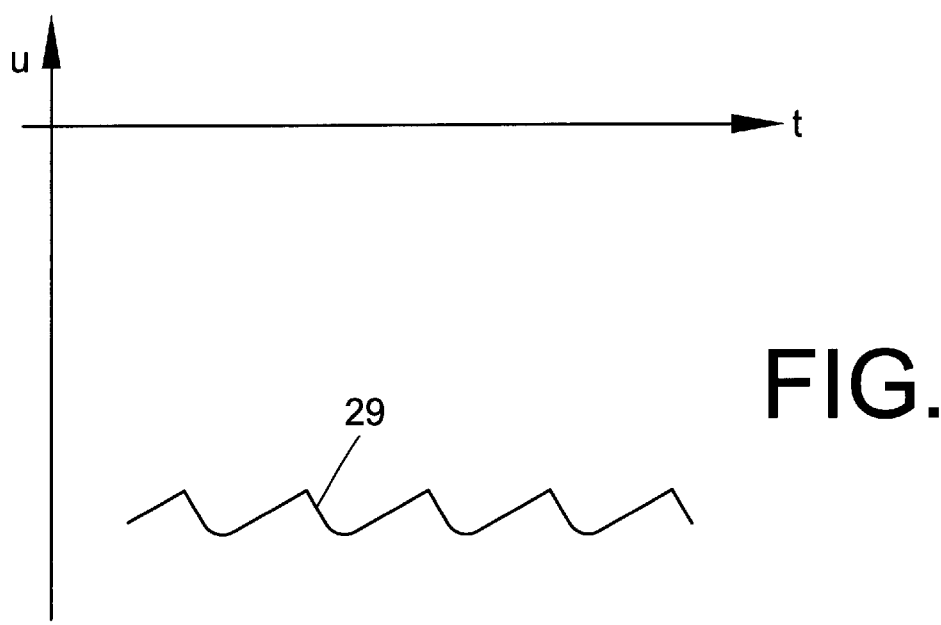
FIG. 4 is a graphical illustration of a simplified waveform of the voltage on another capacitor of the circuit of FIG. 2.

If the rise of the oscillation representing the rotor attitude and the controller output signals exceeds, independently of frequency and amplitude, a particular maximum value, the waveform of the voltage 28 on the capacitor 22 is shown in the schematic view of FIG. 3 and the waveform of the voltage 29 on the capacitor 23 is shown in the schematic view of FIG. 4. As a result, a significantly smaller amplitude is adjusted on the voltage output 27 for voltage $U_A$ than for the voltage $U_E$. The voltage waveforms on the capacitors 22, 23 occur when the rise (dU/dt) of the voltage waveform on the voltage input 13 over a time axis is greater than the rise of the voltage waveforms on the capacitors 22, 23. The amount of the rise of the voltage waveform on the capacitors 22, 23 and therewith the maximum amount of the particular positive or negative rise is determined by the level of the current flow maintained by the constant current sources 18, 19 and by the capacitance value of the capacitors 22, 23. The actuating control signal is derived from this voltage. For example, the rotary frequency of the spinning rotor 1 can be approximately 2 kHz, and the speed of the spinning rotor 1 approximately 120,000 rpm.

If the voltage input 13 is additionally loaded or superposed with a voltage $U_E'$ formed as a low-frequency alternating voltage this low-frequency alternating voltage is largely unchanged on the voltage output 27 in contrast to the alternating voltage derived from high-frequency signals. A slow nutational movement of the spinning rotor 1 that is detected, for example, by the evaluation of the rotor attitude signals as a low-frequency oscillation, can be optimally damped therewith. Thus, the energy consumption required for the attitude control of spinning rotor 1 may be kept low, and an overloading of the actuating elements 7, 8, 9, 10 and of the amplifiers feeding the actuators may be prevented.

FIG. 5 shows by way of example the controller output signal represented as a voltage waveform denoted by reference numeral 30. The waveform is a function of the rotor speed and of the attitude of the spinning rotor 1 and represents controller output signals. A first resultant signal 32 is derived from the voltage on the capacitor 22 in the area of amplitude maximums 31 in a manner in accordance with the invention. In a first section, the rising area 33 of the curve of the first resultant signal 32 largely follows the waveform of the controller output signal 30 until the amplitude maximum 31. On the other hand, if the rise of the waveform of the controller output signal 30 exceeds a predetermined value in the falling area 34 after the amplitude maximum 31 or if the negative value there exceeds this predetermined value, the curve of the first resultant signal 32 runs in its falling area 35 as a straight line with a rise or a fall corresponding to this predetermined value. The curve of the first resultant signal 32 in its falling, straight-line area 35 represents the discharge of the capacitor 22. When the curve of the controller output signal 30 crosses the curve of the first resultant signal 32 at an intersection 36 (that is, if the voltage $U_E$ represented by the curve of controller output signal 30 exceeds the voltage of capacitor 22), the discharge process of the capacitor 22 is ended and the capacitor 22 recharged. Accordingly, the curve of the first resultant signal 32 largely follows the waveform of the controller output signal 30 again as of the intersection 36, and a new cycle begins.

A second resultant signal 37 is formed in the area of amplitude minimums 38. The curve of the second resultant signal 37 largely follows the waveform of the controller output signal 30 until the amplitude minimum 38 in a first area 39 in which it falls or the rise is negative. On the other hand, if the rise of the waveform of the controller output signal 30 exceeds a predetermined value after the amplitude minimum 38 in area 40, the curve of the second resultant signal 37 runs in its rising area 41 as a straight line with a rise corresponding to this predetermined value.

In its rising, straight-line area 41, the curve of the second resultant signal 37 represents a discharge of the capacitor 22. When the curve of the second resultant signal 37 crosses the curve of the controller output signal 30 at an intersection 42, the curve of the second resultant signal accordingly largely follows the waveform of the controller output signal 30 again as of the intersection 42, and a new cycle begins.

The slight differences between the waveform of the controller output signal 30 and the waveform of the first resultant signal 32 in the area of amplitude maximums 31, and between the waveform of the controller output signal 30 and the waveform of the second resultant signal 37 in the area of amplitude minimums 38, result from the diode threshold values of the diodes 16, 17. These slight differences are negligibly small.

Each of the two resultant signals 32, 37 could be used by itself for attitude control or for damping. If, however, a new signal 43 is formed from an arithmetic average of the two resultant signals 32, 37, the amplitude of the new signal 43 can be reduced in comparison to the amplitudes of the two resultant signals 32, 27 and the waveform of the new signal 43 can be smoothed. A further savings of energy can be achieved with a smoothing of the waveform of the new signal 43.

FIG. 6 shows another voltage waveform 44 representative of control output signals. Like the one in FIG. 5, this waveform is also a function of the rotor speed and of the attitude of spinning rotor 1 and represents controller output signals. In the view of FIG. 6, a low-frequency oscillation, such as the one produced by a relatively slow nutational movement of a spinning rotor 1, is superposed on the high-frequency oscillation dependent on the rotor speed. The waveform of this low-frequency oscillation is readily recognizable and made clearer by the course of a line 46 formed tangentially to the amplitude maximums 45 of the controller output signal 44 and by the course of a line 48 formed tangentially to the amplitude minimums 47 of the controller output signal 44.

A new signal 49 with the waveform shown in FIG. 7 forms in the same manner as was explained using FIG. 5 upon a limitation of the rise from the waveform of curve 44 in falling areas 50 following the amplitude maximums 45. Similarly, the waveform of a new signal 51 forms in a corresponding manner upon a limitation of the rise from the waveform of curve 44 in the rising areas 52 following the amplitude minimums 47.

It should be noted that in the simplified view of FIG. 7, the amplitude maximums of the waveform of the resultant signal 49 and the amplitude minimums of the waveform of the resultant signal 51 are shown as angular "peaks." In actuality, the amplitude maximums of the waveform of resultant signal 49 and the amplitude minimums of the waveform of resultant signal 51 do not run in the form of a peak, but rather are rounded off like the amplitude maximums 45 and the amplitude minimums 47 of the waveform of the controller output signal 44.

If both resultant signals 49, 51 are combined and an arithmetic average formed from them, a new signal 53 is produced from which the correcting variable may be derived. The formation of the new signal 53, shown in idealized form, can take place with the aid of voltage dividers or resistors or by a computer.

The same low-frequency oscillation is mapped with the waveform of the new signal 53 as with the waveform of the control output signal 44, but the amplitude of the waveform of the new signal 53 is distinctly smaller than the amplitude of the waveform 44. Thus, the new signal 53 is considerably more suited as a correcting variable for the attitude control than the controller output signals from which the waveform 44 is derived. The lowering of the amplitudes takes place at relatively small phase error or at a phase error that is close to zero and is tolerable.

A circuit 12 which is flexibly designed as regards the rotor speeds permits effective attitude control and damping to be carried out in a simple and energy-saving manner.

Figure 8:
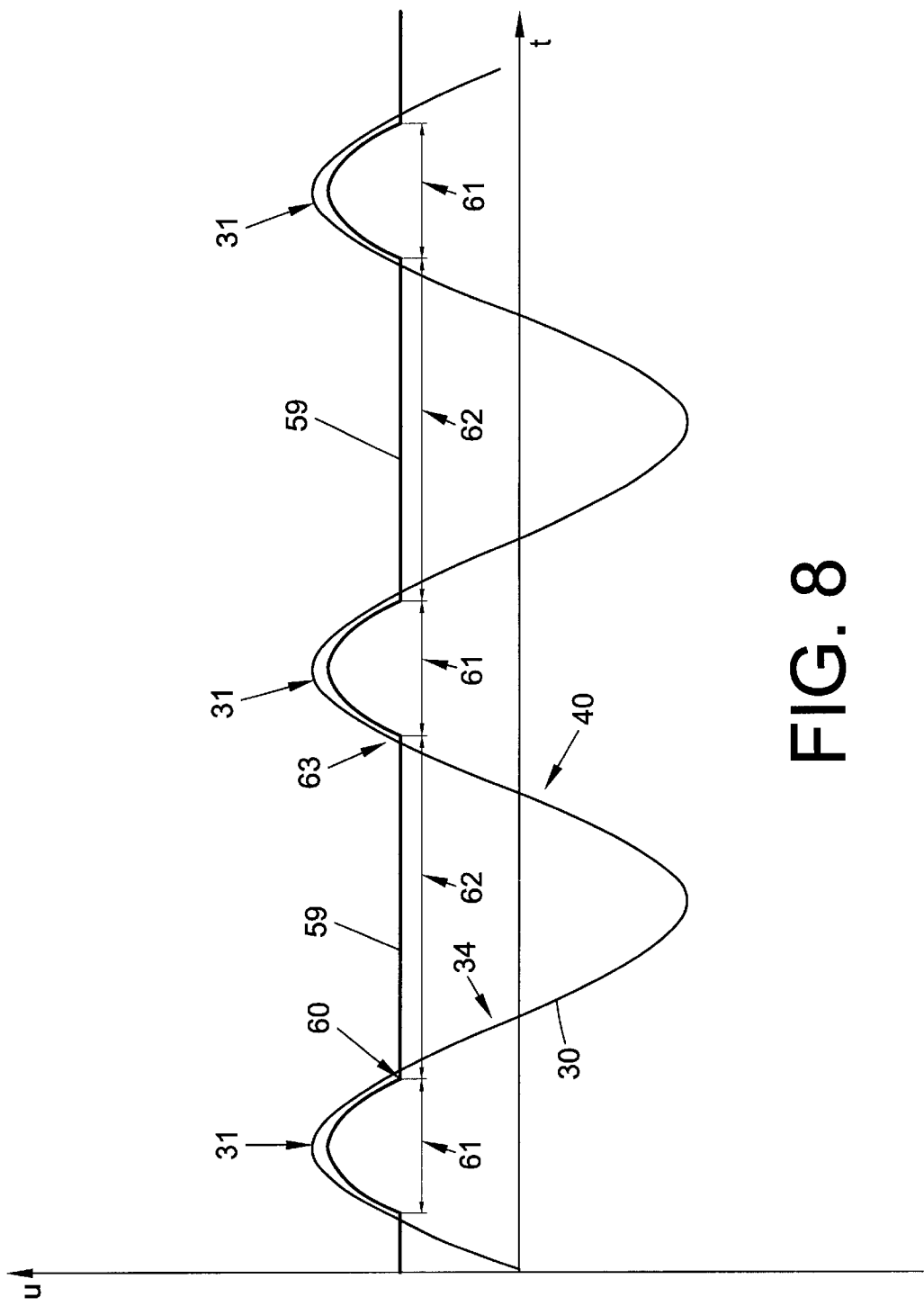
FIG. 8 is a graphical illustration of the waveform of a resultant signal whose area-by-area rise is zero.

Like FIG. 5, FIG. 8 shows a waveform representative of the controller output signal 30. A resultant signal 59 follows the curve of controller output signal 30 to a first point 60. The rise of the resultant signal 59 in section 62 is zero between the first point 60 and a second point 63. After the second point 63, the curve of the resultant signal 59 again follows the curve of controller output signal 30 in the area of the amplitude maximum 31, and a new cycle begins. The resultant signal 59 may be generated from controller output signals 30 by a processor that is a component of the control device 6. The particular position of the first point 60 and of the second point 63 in the cycles may be determined as a function of the frequency. Alternatively, a signal corresponding to the resultant signal 59 can also be generated with inclusion of the amplitude minimums 38 instead of the amplitude maximums 31.

Figure 9:
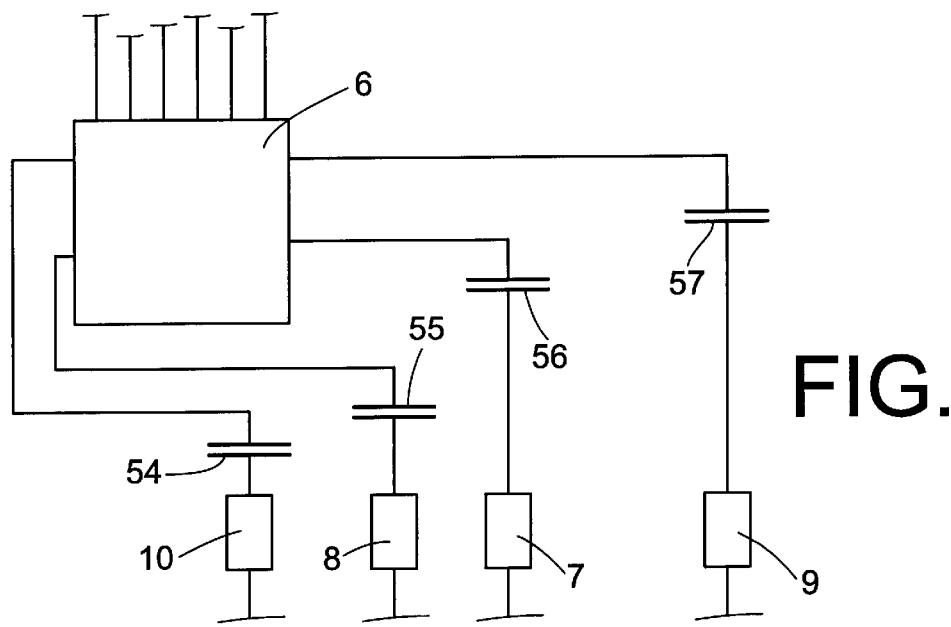
FIG. 9 is a schematic view of a control device with downstream capacitors, in accordance with an alternative embodiment of the present invention.
Figure 10:
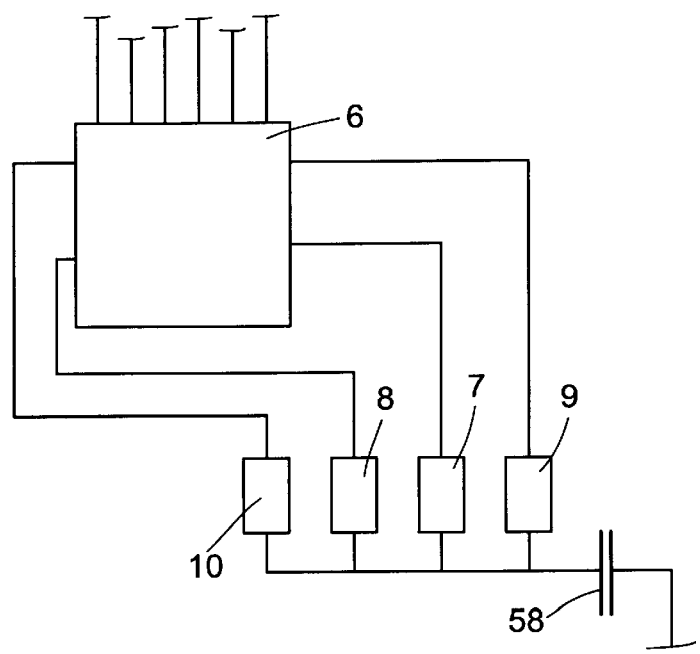
FIG. 10 is a schematic view of a control device with downstream capacitors in accordance with a further alternative embodiment of the present invention.

FIGS. 9 and 10 show alternative embodiments of the present invention in which at least one capacitor is arranged after the control device 6 in order to decouple the direct current component of the signal. FIG. 9 shows capacitors 54, 55, 56, 57 connected in series between the control device 6 and the actuators 7, 8, 9, 10. In another embodiment, the respective capacitors can also be arranged inside the control device 6 (not shown).

FIG. 10 shows a further embodiment in which a single capacitor 58 is disposed after all of the actuators 7, 8, 9, 10. The decoupling of the direct current component, in particular in the case of an asymmetric signal waveform, results in a shifting of the signal average to the zero point. The actuators 7, 8, 9, 10 are relieved by the decoupling of the direct current component.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A device for the radial attitude control of a rapidly rotating rotor supported in a contactless manner, the device comprising a sensor device for the continuous generation of rotor attitude signals and a control device for processing the rotor attitude signals, the control device including a controller that outputs a rotary-frequency-dependent output resultant signal, generated from the rotor attitude signals, for controlling the actuating device, wherein the resultant signal follows the rotary-frequent waveform of the controller output signal at frequencies below the resonance frequencies of the contactless support, wherein above these resonance frequencies the resultant signal increasingly follows the rotary-frequent waveform of the controller output signal only in the area of at least one of the two extreme values of the waveform, whereby the amplitude of the resultant signal is distinctly smaller than the amplitude of the rotary-frequency-dependent controller output signal, and wherein the resultant signal of the rotary-frequency-dependent oscillation maps superposed oscillations of the controller output signal that are low-frequency in comparison to it in a practically unchanged manner.

2. The device according to claim 1, characterized in that at least one capacitor is connected in after the control device.

3. The device according to claim 1, characterized in that the rotary frequency at which the waveform of the resultant signal follows the waveform of the controller output signal only in the area of one of the two extreme values of the waveform is at least twice as high as the decisive resonance frequency of the contactless support.

4. The device according to claim 1, characterized in that the control device is set up in such a manner that the reduction of the amplitude of the resultant signal relative to the amplitude of the rotary-frequency-dependent controller output signal is effected in that the sections outside of the areas in which the resultant signal follows the waveform of the controller output signal, the rise of the curve of the resultant signal is limited to a maximum amount.

5. The device according to claim 4, characterized in that each section in which the rise of the curve of the resultant signal is limited to a maximum amount begins at a respective extreme value and ends when the value of the controller output signal again attains the instantaneous value of the resultant signal.

6. The device according to claim 4, characterized in that the control device is set up in such a manner that the width of each respective area in which the resultant signal follows the waveform of the controller output signal is determined as a function of the rotary frequency and that outside of these areas the rise of the curve of the resultant signal is zero.

7. The device according to claim 4, characterized in that the control device is set up for forming a new signal from the arithmetic average of two resultant signals, wherein one resultant signal follows the waveform of the controller output signal only in the area of one of the two extreme values of the waveform, wherein the other resultant signal follows the waveform of the controller output signal only in the area of the other of the two extreme values, and wherein the new signal formed from the arithmetic average is output to the actuating devices as the actuating control signal.

8. The device according to claim 7, characterized in that the control device comprises a quasi symmetric circuit for forming the new signal.

9. The device according to claim 8, characterized in that the quasi symmetric circuit includes two branches, each branch including at least one diode, a capacitor whose capacitance determines the maximum amount of the rise for the area in which the limitation is effective, a constant current source and a resistor.

10. The device according to claim 9, characterized in that the circuit is constructed in such a manner that two parallel current paths run between a voltage input and a voltage output of the circuit, wherein the first current path and the second current path each run via a diode, wherein the diode of the first current path lets current through if a positive voltage is on the voltage input, wherein the diode of the second path lets current through if a negative voltage is on the voltage input, wherein two constant current sources are respectively connected to the outputs of the diodes, the constant current sources being designed in such a manner that the constant current source of the first current path feeds a negative current and the constant current source of the second current path feeds a positive current, wherein two capacitors are respectively disposed between the outputs of the diodes and a ground source and wherein two resistors are respectively disposed between the outputs of the diodes and the voltage output.

11. The device according to claim 10, characterized in that the resistors are designed in such a manner that the currents flowing in the respective resistors are distinctly smaller than the currents flowing in its associated constant current source.

* * * * *